US009187331B2

(12) United States Patent
Mishiro et al.

(10) Patent No.: US 9,187,331 B2
(45) Date of Patent: Nov. 17, 2015

(54) METHOD FOR PRODUCING CARBONACEOUS FILM, METHOD FOR PRODUCING GRAPHITE FILM, ROLL OF POLYMER FILM, AND ROLL OF CARBONACEOUS FILM

(75) Inventors: Makoto Mishiro, Settsu (JP); Yusuke Ohta, Settsu (JP); Takashi Inada, Settsu (JP); Yasushi Nishikawa, Settsu (JP)

(73) Assignee: KANEKA CORPORATION, Osaka-Shi (JP)

( * ) Notice: Subject to any disclaimer, the term of this patent is extended or adjusted under 35 U.S.C. 154(b) by 0 days.

(21) Appl. No.: 14/008,227

(22) PCT Filed: Mar. 26, 2012

(86) PCT No.: PCT/JP2012/002079
§ 371 (c)(1),
(2), (4) Date: Dec. 11, 2013

(87) PCT Pub. No.: WO2012/132390
PCT Pub. Date: Oct. 4, 2012

(65) Prior Publication Data
US 2014/0110869 A1  Apr. 24, 2014

(30) Foreign Application Priority Data

Mar. 28, 2011 (JP) .................................. 2011-071011
Sep. 12, 2011 (JP) .................................. 2011-198580

(51) Int. Cl.
*C01B 31/02* (2006.01)
*C01B 31/04* (2006.01)
*B29C 35/00* (2006.01)

(52) U.S. Cl.
CPC ................. *C01B 31/04* (2013.01); *C01B 31/02* (2013.01); *Y10T 428/24744* (2015.01)

(58) Field of Classification Search
USPC ................................................. 264/29.1, 605
See application file for complete search history.

(56) References Cited

U.S. PATENT DOCUMENTS

2011/0169180 A1* 7/2011 Inada et al. ................... 264/29.1
2012/0121880 A1   5/2012 Ohta et al.
2013/0240128 A1* 9/2013 Mishiro et al. ................ 156/185

FOREIGN PATENT DOCUMENTS

| JP | 63-256508 A |  | 10/1988 |
| JP | 05132360 A | * | 5/1993 |
| WO | WO 2010/150300 A1 |  | 12/2010 |
| WO | WO 2011/111380 A1 |  | 9/2011 |

OTHER PUBLICATIONS

PCT/ISA/210—International Search Report mailed on Jun. 5, 2012, issued in PCT/JP2012/002079.

* cited by examiner

*Primary Examiner* — Atul P. Khare
(74) *Attorney, Agent, or Firm* — Birch, Stewart, Kolasch & Birch, LLP

(57) ABSTRACT

Disclosed herein is a method for producing an elongated (rolled) carbonaceous film by polymer pyrolysis while suppressing the fusion bonding of the carbonaceous film. The method for producing a carbonaceous film includes the step of heat-treating a polymer film wound into a roll, wherein the heat treatment is performed after the polymer film is wound into a roll to have a gap between adjacent layers of the polymer film at a temperature lower than a pyrolysis onset temperature of the polymer film so that the roll of polymer film as a whole satisfies a relationship that a value obtained by dividing a thickness of a gap between adjacent layers of the polymer film (Ts) by a thickness of the polymer film (Tf) (Ts/Tf) is 0.16 or higher but 1.50 or lower. As a method for forming gaps between the layers of the polymer film, a method in which the polymer film is wound into a roll together with a slip sheet and then the slip sheet is removed can be used, which is effective at suppressing the fusion bonding of a carbonaceous film.

7 Claims, 8 Drawing Sheets

METHOD FOR PRODUCING CARBONACEOUS FILM, METHOD FOR PRODUCING GRAPHITE FILM, ROLL OF POLYMER FILM, AND ROLL OF CARBONACEOUS FILM

TECHNICAL FIELD

The present invention relates to a method for producing an elongated (rolled) carbonaceous film by polymer pyrolysis. More specifically, the present invention relates to an elongated carbonaceous film production process that is an intermediate stage of graphite film production.

BACKGROUND ART

Graphite film is a material having excellent properties such as high thermal conductivity, and is therefore widely used in electronic parts and the like. Examples of a method for producing a commonly-available high thermal conductive graphite film include an expanding method in which exfoliated graphite is rolled into a sheet and a polymer pyrolysis method.

For example, a graphite film production method has been disclosed, in which a polymer film is wound around a graphitic carbon cylinder, more specifically, a laminate of three sheets of POD film having a width of 180 mm and a thickness of 50 μm is wound around a graphitic carbon cylinder having an outer diameter of 68 mm, an inner diameter of 64 mm, and a length of 200 mm and heated at 1800° C. or higher in an inert gas or in a vacuum to obtain an elongated graphite film. (Patent Document 1)

PRIOR ART DOCUMENTS

Patent Document

Patent Document 1: JP-A-63-256508

DISCLOSURE OF THE INVENTION

Problems to be Solved by the Invention

However, the method disclosed in Patent Document 1 has a problem that, in a carbonization step to obtain a carbonaceous film which is a preliminary step in polymer pyrolysis, rippling occurs at the end(s) of a resulting roll of carbonaceous film. Further, when the number of windings is increased, a produced decomposition gas is less likely to be released from between the layers of the film and is therefore fixed between the layers of the film when cooled and acts like an adhesive so that fusion bonding occurs in a resulting roll of carbonaceous film.

It is therefore an object of the present invention to produce an elongated carbonaceous film while the fusion bonding of the carbonaceous film is suppressed.

The reason why the fusion bonding of a carbonaceous film occurs is that a decomposition gas produced during carbonization/decomposition accumulates between the layers of the film and is then fixed when cooled and acts like an adhesive. The size of a resulting carbonaceous film is about 80% of that of a polymer film as a raw material due to shrinkage during carbonization/decomposition. When a polymer film is wound into a roll, the layers of the film press against one another due to the shrinkage during carbonization/decomposition, and therefore a decomposition gas produced during carbonization/decomposition cannot be released from between the layers of the film so that fusion bonding occurs.

Means for Solving the Problems

The present invention provides a method for producing a carbonaceous film, including the step of heat-treating a polymer film wound into a roll, wherein the heat treatment is performed after the polymer film is wound into a roll to have a gap between adjacent layers of the polymer film at a temperature lower than a pyrolysis onset temperature of the polymer film so that the roll of polymer film as a whole satisfies a relationship that a value obtained by dividing a thickness of a gap between adjacent layers of the polymer film (Ts) by a thickness of the polymer film (Tf) (Ts/Tf) is 0.16 or higher but 1.50 or lower (Claim 1), the carbonaceous film production method according to claim 1, wherein the gap between adjacent layers of the polymer film is formed by winding the polymer film into a roll together with a slip sheet and then removing the slip sheet (Claim 2), the carbonaceous film production method according to claim 1, wherein the gap between adjacent layers of the polymer film is formed by rewinding the polymer film wound around a core in a direction opposite to a winding direction of the polymer film (Claim 3), and the carbonaceous film production method according to claim 1, wherein the gap between adjacent layers of the polymer film is formed by reducing a pressure in a heating furnace at a temperature lower than the pyrolysis onset temperature of the polymer film (Claim 4).

The present invention also provides a method for producing a graphite film, including heat-treating a carbonaceous film produced by the carbonaceous film production method according to any one of claims 1 to 4 to a temperature of 2400° C. or higher (Claim 5).

The present invention also provides a roll of polymer film to be used in the carbonaceous film production method according to any one of claims 1 to 4, which has a gap between adjacent layers of the polymer film to satisfy, as a whole, a relationship that a value obtained by dividing a thickness of a gap between adjacent layers of the polymer film (Ts) by a thickness of the polymer film (Tf) (Ts/Tf) is 0.16 or higher but 1.50 or lower (Claim 6).

The present invention also provides a roll of polymer film to be used in the graphite film production method according to claim 5, which has a gap between adjacent layers of the polymer film to satisfy, as a whole, a relationship that a value obtained by dividing a thickness of a gap between adjacent layers of the polymer film (Ts) by a thickness of the polymer film (Tf) (Ts/Tf) is 0.16 or higher but 1.50 or lower (Claim 7).

The present invention also provides a roll of carbonaceous film to be used in the graphite film production method according to claim 5, which has a gap between adjacent layers of the carbonaceous film to satisfy, as a whole, a relationship that a value obtained by dividing a thickness of a gap between adjacent layers of the carbonaceous film (Ts) by a thickness of the carbonaceous film (Tf) (Ts/Tf) is 0.16 or higher but 1.50 or lower (Claim 8).

Effects of the Invention

According to the production method of the present invention, an appropriate gap(s) can be stably provided between the layers of the polymer film wound into a roll in a carbonization step, and therefore a gas produced by carbonization/decomposition can be easily released from between the layers of the polymer film, which makes it possible to obtain a roll of carbonaceous film or a roll of graphite film while suppressing fusion bonding.

PREFERRED MODE FOR CARRYING OUT THE INVENTION

The present invention provides a method for producing a carbonaceous film, including the step of heat-treating a polymer film wound into a roll, wherein the heat treatment is performed after the polymer film is wound into a roll to have a gap between adjacent layers of the polymer film at a temperature lower than a pyrolysis onset temperature of the polymer film so that the roll of polymer film as a whole satisfies a relationship that a value obtained by dividing a thickness of a gap between adjacent layers of the polymer film (Ts) by a thickness of the polymer film (Tf) (Ts/Tf) is 0.16 or higher but 1.50 or lower.

Figure 1:
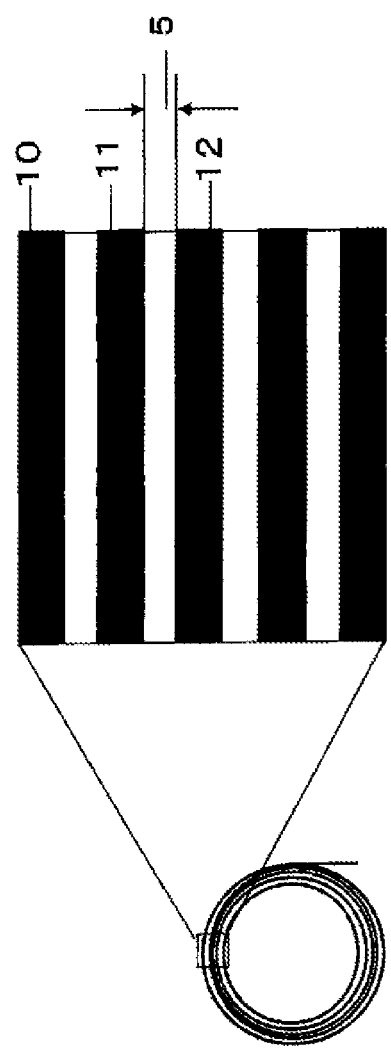
FIG. 1 is a drawing showing adjacent layers of a polymer film according to the present invention.

The term "adjacent layers of the polymer film" as used herein refers to, when any portion in the roll of polymer film is specified, the layers (i.e., inner and outer layers) of the polymer film present adjacent to each other. For example, in FIG. 1, the adjacent layers of the polymer film correspond to a polymer film 10 and a polymer film 11 or the polymer film 11 and a polymer film 12.

The term "roll" as used herein represents the state of the wound polymer film, and the cross-sectional shape of the roll is not limited and may be, for example, a true circle, an ellipse, or a rectangle.

The term "roll of polymer film" as used in the present invention refers to the polymer film wound into a roll, or refers to, when a core is present, a combination of the core and the polymer film wound into a roll. It is to be noted that the roll of polymer film may have a gap(s) (space) inside.

The reason why the fusion bonding of a carbonaceous film occurs is that a decomposition gas produced during carbonization/decomposition accumulates between the layers of the film and is then fixed when cooled and acts like an adhesive. The size of a resulting carbonaceous film is about 80% of that of a polymer film as a raw material due to shrinkage during carbonization/decomposition. When a polymer film is wound into a roll, the layers of the film press against one another due to the shrinkage during carbonization/decomposition, and therefore a decomposition gas produced during carbonization/decomposition cannot be released from between the layers of the film so that fusion bonding occurs. For this reason, by previously providing a gap(s) between the layers of the film, pressing of the layers of the polymer film against one another caused by shrinkage during carbonization/decomposition can be relieved, and therefore fusion bonding can be improved.

The term "pyrolysis onset temperature of the polymer film" as used herein is defined as a temperature at which, when the polymer film is heat-treated, a weight reduction of 1.0% of the initial weight of the polymer film is achieved. More specifically, the pyrolysis onset temperature of the polymer film is defined as a temperature at which a 1.0% weight reduction is achieved when 10 mg of a sample is heat-treated using a thermal analysis system EXSTAR6000 and a thermogravimetric measurement device TG/DTA 220U manufactured by SII Nano Technology Inc. under a flowing nitrogen atmosphere (200 mL/min) from room temperature (23° C.) to 1000° C. at a temperature rise rate of 10° C./min.

In the case of polyimide films (APICAL AH manufactured by Kaneka Corporation, 75 μm, APICAL AV manufactured by Kaneka Corporation, thickness: 50 μm) used in Examples of the present invention, their pyrolysis onset temperature is 500° C. The measurement of the pyrolysis onset temperature was made according to the above definition.

(Value Obtained by Dividing Thickness of Gap Between Adjacent Layers of Polymer Film (Ts) by Thickness of Polymer Film (Tf) (Ts/Tf))

The roll of polymer film has a gap(s) between adjacent layers of the polymer film so that a value of Ts/Tf of the entire roll of polymer film is 0.16 or higher, which is obtained by dividing the thickness of a gap between adjacent layers of the polymer film (Ts) by the thickness of the polymer film (Tf). The value of Ts/Tf is preferably 0.20 or higher, more preferably 0.22 or higher, even more preferably 0.25 or higher, most preferably 0.30 or higher. Particularly, the value of Ts/Tf is preferably 0.33 or higher, more preferably 0.5 or higher, even more preferably 0.6 or higher. The upper limit value of Ts/Tf is not particularly limited.

Further, the rippling of a carbonaceous film can also be suppressed by setting the value of Ts/Tf to 0.16 to 1.5, preferably 0.33 to 1.5. The rippling of a carbonaceous film occurs when the degree of, freedom of the polymer film is high during shrinkage caused by carbonization/decomposition. When the rippling of a carbonaceous film occurs, the carbonaceous film has surface irregularities that appear as ripples at the end(s) of the roll of carbonaceous film. Therefore, limiting the thickness of a gap between the layers of the polymer film to a certain extent is effective at suppressing rippling. In order to suppress the rippling of a carbonaceous film, the value of Ts/Tf is preferably 1.5 or lower, more preferably 1.0 or lower, even more preferably 0.9 or lower. That is, by setting the value of Ts/Tf to 0.16 or higher, preferably 0.33 or higher, fusion bonding can be improved, and by setting the value of Ts/Tf to 1.5 or lower, the rippling of a carbonaceous film can be suppressed.

The above-described Ts/Tf is a value determined for the entire roll of polymer film.

(Method for Measuring Ts/Tf)

<1> When a winding core is present, the outer diameter (Rs) of the winding core is measured (hereinafter, the winding core is also referred to as "core").

Figure 7:
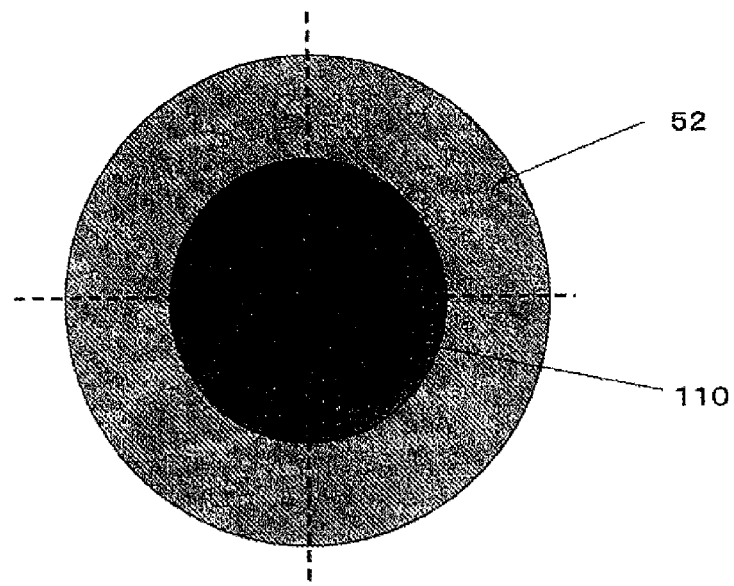
FIG. 7 is a drawing showing an end of a roll of polymer film according to the present invention.

<2> The end of outermost layer of a roll of polymer film 52 is fixed so as not to move, and then the inner diameter (Ra) and the outer diameter (Rb) of the roll of polymer film are measured. In the measurement of Ra and Rb, as shown in FIG. 7, an average of the length of a line segment on a straight line passing through the center of the roll of polymer film 52 and the outermost end of the roll of polymer film 52 and the length of a line segment on a straight line orthogonal to the above straight line is used. The term "outermost end" as used herein refers to the end of outermost layer of the roll of polymer film farthest from the center of the roll of polymer film. It is to be noted that in FIG. 7, the end face (side face) of the roll of polymer film is shown as a true circle, but is not limited thereto.

It is to be noted that when a diameter or a thickness related to the roll of film is measured in the present invention, as described above, an average of the length of a line segment on a straight line passing through the center of the roll of polymer film 52 and the outermost end of the roll of polymer film and the length of a line segment on a straight line orthogonal to the above straight line is always used.

Figure 8:
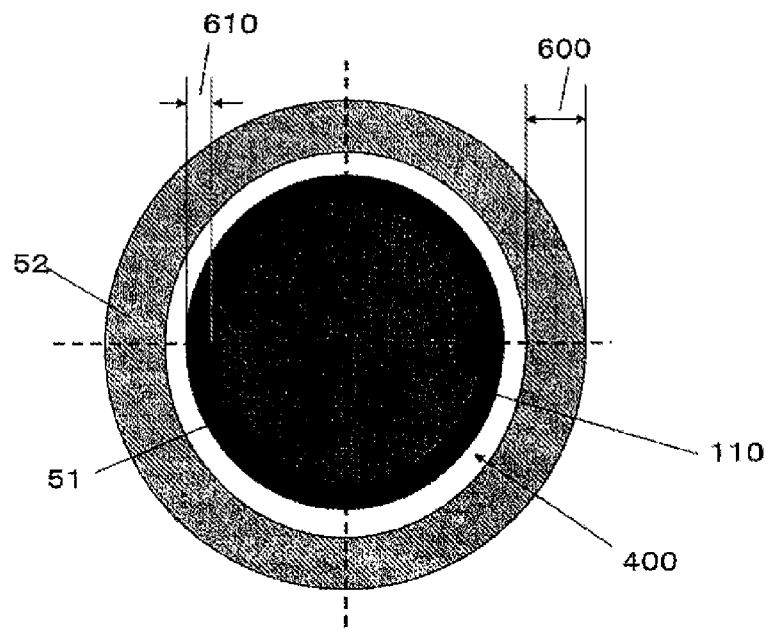
FIG. 8 is a drawing showing an end of the roll of polymer film according to the present invention during measurement of Ts/Tf.

<3> When a gap(s) is(are) present inside the roll of polymer film 52, the value of Ts/Tf is determined in the following manner. The polymer film is wound around a core 110, provided inside the innermost layer of the roll of polymer film 52, from the inner end thereof while a tension of 10 N/m or more is applied thereto so that no gap is formed between the layers of the polymer film (FIG. 8). While the polymer film is wound around the core in such a way, a thickness 610(A) of layers of a polymer film 51 wound around the core and a thickness 600(B) of the roll of polymer film 52, located outside the polymer film 51 wound around the core, after winding the polymer film around the core are measured every time the number of layers of the polymer film rewound from the roll of polymer film 52 reaches 10 after the roll of polymer film 52 is started to be rewound from the inner side thereof.

Here, when the thickness of layers of the polymer film 51 wound around the core at the time when the first 10 layers of the roll of polymer film 52 are rewound is defined as $A_1$, the thickness of layers of the polymer film 51 at the time when 10 n layers of the roll of polymer film 52 are rewound is represented as $A_n$. Similarly, the thickness of the roll of polymer film 52 after winding the polymer film around the core at the time when 10 n layers are rewound is represented as $B_n$.

The measurement of thickness is made using a calibrated vernier caliper by bringing the vernier caliper into contact with the polymer film without applying pressure on the polymer film. The thickness of the roll of polymer film 52 is measured at four points at which mutually-orthogonal straight lines passing through the center of the roll of polymer film 52 intersect with the roll of polymer film 52, and an average of the measurements is used as the thickness of the roll of polymer film 52.

<4> The polymer film 51 wound around the core has the same cross-sectional area as the polymer film rewound from the roll of polymer film 52, and therefore the cross-sectional area of the gap(s) (space) formed between the layers of the polymer film is determined by calculating a difference between the cross-sectional area of a portion where the polymer film is rewound from the roll of polymer film 52 and the cross-sectional area of a portion where the polymer film is wound around the core. Further, the cross-sectional area of the gap(s) formed between the layers of the polymer film is divided by the cross-sectional area of the polymer film as the formula below to determine the ratio of the gap(s) formed per length of 10 layers of the polymer film (i.e., Ts/Tf). It is to be noted that the values of the ratio may be graphed to determine the ratio of the gap(s) present between the inner end and the specific point (e.g., between the inner end and the 50% film length point) of the entire polymer film.

$$T_s/T_f = ((Ra/2+B_n)^2\pi - (Ra/2+B_{n-1})^2\pi - ((Rs/2+A_n)^2\pi - (Rs/2+A_{n-1})^2\pi))/((Rs/2+A_n)^2\pi - (Rs/2+A_{n-1})^2\pi))$$ [Formula 1]

<5> Finally, the thickness of layers of the polymer film wound around the core is measured after the entire polymer film is wound around the core without forming any gap to determine the cross-sectional area of the entire roll of polymer film having no gap.

By determining the cross-sectional area of the entire roll of polymer film, it is also possible to determine a point 50% of the total film length away from the end of the innermost layer of the roll of polymer film and therefore to determine the ratio of the gap(s) formed between the end of the innermost layer and the 50% film length point of the roll of polymer film.

It is to be noted that when the roll of polymer film has an elliptical or non-circular cross-sectional shape, the cross-sectional shape of the roll of polymer film is brought close to a circle so that the length of a line segment on a straight line passing through the center of the roll of polymer film and the outermost end of the roll of polymer film and the length of a line segment on a straight line orthogonal to the above straight line are approximately the same to perform measurements according to <1> to <5>.

(Ratio of Layers of Polymer Film Between which Gap is Formed)

The ratio of layers of the polymer film between which a gap is provided to the total layers of the polymer film of the roll of polymer film is preferably 30% or higher, more preferably 50% or higher, even more preferably 75% or higher. By setting the ratio of layers of the polymer film between which a gap is provided to the total layers of the polymer film of the roll of polymer film to 30% or higher, preferably 50% or higher, pressing of the layers of the polymer film against one another during carbonization/decomposition can be relieved.

(Location where Gap Between Layers of Polymer Film is Formed)

A gap(s) between the layers of the polymer film is(are) particularly preferably formed on the inner peripheral side of the roll of polymer film. The polymer film tends to shrink toward the inside of the roll of polymer film during carbonization/decomposition, and therefore pressing of the layers of the polymer film against one another notably occurs particularly on the inner peripheral side of the roll of polymer film. Therefore, fusion bonding is also likely to occur on the inner peripheral side of a roll of carbonaceous film. Therefore, when gaps having the same cross-sectional area are formed, one formed nearer the innermost layer of the roll of polymer film is preferred because a higher fusion bonding-relieving effect is obtained. When a gap(s) is(are) formed on the inner peripheral side of the roll of polymer film, a gap(s) may or may not be formed on the outer peripheral side of the roll of polymer film. However, gaps are preferably formed not only on the inner peripheral side but also on the outer peripheral side of the roll of polymer film because fusion bonding is more likely to be relieved.

(Timing to Form Gap Between Layers of Polymer Film)

A gap(s) between the layers of the polymer film need(s) to be formed before the temperature of heat treatment first reaches the pyrolysis onset temperature of the polymer film. By forming a gap(s) before the start of pyrolysis, shrinkage during carbonization/decomposition can be relieved, and therefore fusion bonding can be suppressed. A gap(s) between the layers of the polymer film may be formed before the polymer film is set in a furnace or may be formed in the process of heat treatment.

(Method for Forming Gaps Between Layers of Polymer Film)

Examples of a method for forming gaps between the layers of the polymer film include: (1) a method in which the roll of polymer film is loosened by reducing the pressure in the process of heat treatment; (2) a method in which the polymer film is wound into a roll together with a slip sheet and then the slip sheet is removed; and (3) a method in which the polymer film wound around a core is rewound in a direction opposite to the winding direction of the polymer film.

(1) Method in which Gaps are Formed by Heating Under Reduced Pressure

In the case of a method in which heat treatment is performed under a reduced pressure, air trapped between the layers of the polymer film during winding the polymer film or moisture absorbed by the polymer film is expanded so that the roll of polymer film is loosened and therefore gaps are formed.

The temperature zone at which a reduced pressure is performed is preferably a temperature zone before which carbonization/decomposition of the polymer film starts. More specifically, the temperature zone at which a reduced pressure is performed is preferably in the range of room temperature to 500° C., more preferably in the range of 100 to 450° C., even more preferably in the range of 300 to 450° C. In the zone at or above which carbonization/decomposition of the polymer film starts, fusion bonding can be further improved by configuring a furnace so that a gas in the furnace can be discharged while an inert gas such as nitrogen or argon is introduced into the furnace.

Examples of a method for controlling the size of gaps include: a method in which the amount of air to be trapped or the amount of moisture to be absorbed is controlled and a method in which an external tube or the like is provided outside the roll of polymer film so that the loosening of the roll of polymer film can be regulated.

(2) Method in which Polymer Film is Wound into Roll Together with Slip Sheet and then Slip Sheet is Removed In the case of a method in which the polymer film is wound into a roll together with a slip sheet and then the slip sheet is removed, the size of resulting gaps corresponds to the thickness of the slip sheet and therefore can be easily controlled to any value. Therefore, for example, gaps on the inner peripheral side of the roll of polymer film where fusion bonding is more likely to occur can be made larger than those on the outer peripheral side of the roll of polymer film, which makes it possible to more effectively suppress fusion bonding. Further, gaps can be stably formed, and therefore variations in the occurrence of fusion bonding can also be suppressed. The gaps formed between the layers of the polymer film are uniform in size, and therefore a shrinkage force during carbonization/decomposition is evenly distributed over the entire polymer film, which is highly effective at suppressing rippling. It is to be noted that the slip sheet may be continuous or discontinuous. For example, the slip sheet may be partially inserted to arbitrarily form a gap(s).

<Timing to Remove Slip Sheet>

The timing to remove the slip sheet is not particularly limited as long as the slip sheet is removed at a temperature lower than the pyrolysis onset temperature of the polymer film. The slip sheet may be removed just after the polymer film is wound into a roll together with the slip sheet or may be removed in the process of heat treatment. However, in view of the ease of removal of the slip sheet or the disposal of the removed slip sheet, the slip sheet is preferably removed before the polymer film is set in a heat treatment furnace.

<Type Of Slip Sheet>

The type of slip sheet to be used is not particularly limited, and examples of the slip sheet include polymer films, paper, and graphite films. The slip sheet is preferably such a film that, when removed, the slip sheet does not cause damage to the polymer film or the slip sheet itself does not tear. Further, when the method in which the polymer film is wound into a roll together with a slip sheet and then the slip sheet is removed is used, the slip sheet is preferably easily removed. Therefore, the slip sheet may be made easy to remove by subjecting the surface thereof to release treatment using a silicone- or fluorine-based agent or the like to improve slipping properties. However, when a component contained in the slip sheet is to adhere to the polymer film, a material that does not inhibit carbonization of the polymer film or does not cause fusion boning or rippling is preferably selected.

<Width of Slip Sheet>

The width of the slip sheet is not particularly limited, but is preferably small to make it easy to remove the slip sheet. More specifically, the width of the slip sheet is preferably 50 mm or less, more preferably 30 mm or less, even more preferably 20 mm or less.

<Location where Slip Sheet is Provided>

When the slip sheet has a smaller width than the polymer film, the slip sheet is preferably provided on the end side of the polymer film. By winding the polymer film into a roll together with the slip sheet in such a manner that the slip sheet is located on the end side of the polymer film, the slip sheet can be easily removed. The polymer film may be wound into a roll together with the slip sheet in such a manner that part of the slip sheet is located outside the end of the polymer film to make it easy to remove the slip sheet. The number of locations where the slip sheet is provided may be one or two or more. For example, when the polymer film is wound into a roll together with the slip sheet in such a manner that the slip sheet is located on the end side of the polymer film, the slip sheets may be provided on both end sides of the polymer film or the slip sheet may be provided on only one of the end sides of the polymer film.

<Method for Removing Slip Sheet>

A method for removing the slip sheet is not particularly limited, but the slip sheet can be removed by mechanical drawing or by using, as the slip sheet, a film that evaporates at a temperature lower than the pyrolysis temperature of the polymer film.

<Winding Conditions>

Conditions under which the polymer film is wound into a roll together with the slip sheet are not particularly limited, but are preferably set so that the slip sheet is easily removed. More specifically, a winding tension is preferably 80 N/m or less, more preferably 40 N/m or less, even more preferably 20 N/m or less. Further, the polymer film may be wound into a roll together with the slip sheet while being diselectrified to improve slippage between them, which makes it easy to remove the slip sheet.

(3) Method in which Polymer Film Wound Around Core is Rewound in Direction Opposite to Winding Direction of Polymer Film Gaps can be formed by winding the polymer film around a core under tension and then rewinding the polymer film in a direction opposite to the winding direction of the polymer film. Further, the size of gaps can also be controlled by, for example, providing a tube outside the roll of polymer film because it is possible to inhibit the expansion of the polymer film beyond the interior space of the tube.

Figure 9:
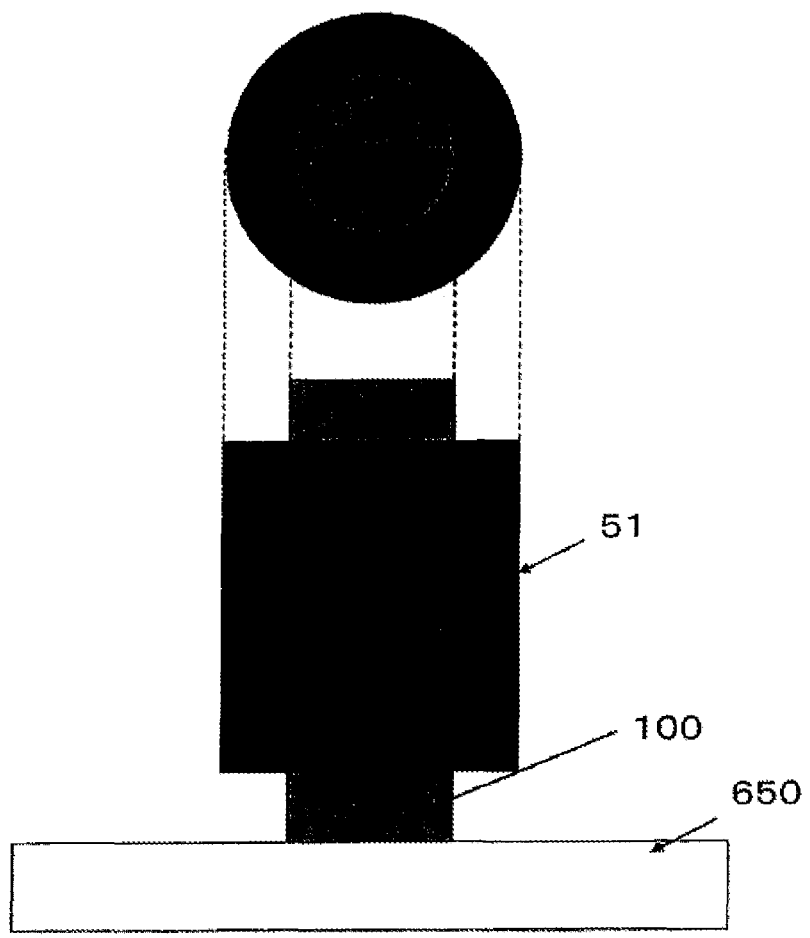
FIG. 9 is a drawing illustrating a method for forming gaps between the layers of a polymer film according to Example 23 of the present invention.

Further, as shown in FIG. 9, when the roll of polymer film wound around a core having a length longer than the width of the roll of polymer film is vertically placed, the polymer film falls down when rewound to loosen the roll of polymer film, which makes it easier to form gaps. This is because a force to expand the polymer film is usually directed outward, but in this case, the force can be directed not only outward but also downward.

(Heat Treatment Method)

A carbonaceous film according to the present invention is obtained through a carbonization step. The carbonization step is a step in which the polymer film is pyrolyzed by preliminary heating to about 1000° C. to obtain a carbonaceous film. The resulting carbonaceous film is a glassy film having a weight that is about 60% of the weight of the polymer film.

Further, the resulting carbonaceous film may be graphitized in a graphitization step to obtain a graphite film. The graphitization step is a step in which the carbonized film produced in the carbonization step is heated to 2400° C. or higher to graphitize the carbonized film. The carbonization step and the graphitization step may be continuously performed, or only the graphitization step may be performed separately after the completion of the carbonization step.

The heat treatment in the carbonization step may be performed in an inert gas or in a vacuum. At an ambient temperature equal to or higher than the pyrolysis onset temperature of the polymer film, introduction of an inert gas is particularly effective. Particularly, a furnace is preferably configured so that a gas in the furnace can be discharged to the outside of the furnace while an inert gas is introduced into the furnace. At a temperature equal to or higher than the pyrolysis onset temperature of the polymer film, a decomposition gas that causes fusion bonding is produced. Therefore, at a temperature equal to or higher than the pyrolysis onset temperature of the polymer film, introduction of an inert gas allows a decomposition gas produced during carbonization/decomposition to be pushed out of a system by the inert gas entering gaps between the layers of a film produced by the production method according to the present invention. Further, the decomposition gas pushed out of the system is discharged to the outside of the furnace together with the inert gas, which makes it possible to reduce the risk of newly causing fusion bonding.

The flow rate of the inert gas to be introduced is not particularly limited, but is preferably 1 L/min or higher, more preferably 3 L/min or higher, even more preferably 5 L/min or higher.

Further, the resulting carbonaceous film may be graphitized in a graphitization step to obtain a graphite film. The graphitization step is a step in which the carbonized film produced in the carbonization step is heated to 2400° C. or higher to graphitize the carbonized film. In this step, the carbonized film is graphitized so that a graphite film having high thermal conductivity is obtained. By converting the carbonized film to a graphite film, the graphite film has significantly-improved thermal conductivity and is increased in size by about 10%.

When a graphite film is produced from the polymer film, the carbonization step and the graphitization step may be performed continuously or only the graphitization step may be performed separately after the completion of the carbonization step.

The heat treatment in the graphitization step may be performed in an inert gas or in a vacuum. The orientation of the roll of carbonaceous film is appropriately selected and may be horizontal or vertical. The core may be used also during graphitization after carbonization or may be removed.

The roll of carbonaceous film obtained in the carbonization step may be directly subjected to the graphitization step, or may be cut into sheets of appropriate size and, if necessary, stacked together before subjected to the graphitization step.

The resulting graphite film may be subjected to a pressing step to impart excellent flexibility to it.

(Shape of Roll of Polymer Film)

In order to obtain a carbonaceous film or a graphite film while suppressing the fusion bonding of the film, a roll of polymer film is preferably used, which has a gap between adjacent layers of the polymer film to satisfy a relationship that a value obtained by dividing a thickness of a gap between adjacent layers of the polymer film (Ts) by a thickness of the polymer film (Tf) (Ts/Tf) is 0.16 or higher (preferably 0.33 or higher) but 1.50 or lower.

(Shape of Roll of Carbonaceous Film)

A roll of carbonaceous film preferably has a gap between adjacent layers of the carbonaceous film to satisfy, as a whole, a relationship that a value obtained by dividing a thickness of a gap between adjacent layers of the carbonaceous film (Ts) by a thickness of the carbonaceous film (Tf) (Ts/Tf) is 0.16 or higher (preferably 0.33 or higher) but 1.50 or lower. By using such a roll of carbonaceous film, a graphite film can be obtained while the fusion bonding of the graphite film is suppressed. Further, the roll of carbonaceous film has a value of Ts/Tf of 0.16 or higher (preferably 0.33 or higher), which is preferred in that a graphite film can be obtained while the occurrence of flaws or tears is suppressed. A preferred range of the value of Ts/Tf of the roll of carbonaceous film is the same as the above-described preferred range of the value of Ts/Tf of the roll of polymer film.

(Container for Accommodating Polymer Film)

A container for accommodating the roll of polymer film having a gap(s) may be optionally provided. When provided, the container is preferably configured so that the roll of polymer film is prevented from excessively expanding or the winding end of the polymer film is prevented from moving. By preventing the roll of polymer film from excessively expanding or by preventing the winding end of the polymer film from moving, it is possible to prevent the rippling of a carbonaceous film. More specifically, for example, a cylindrical tube or the like may be provided outside the polymer film. Further, when the roll of polymer film has a gap(s) between the layers of the polymer film, the inner diameter of the tube is preferably the same as the outer diameter of the roll of polymer film having a gap(s) or larger by about 5% than the outer diameter of the roll of polymer film having a gap(s) in view of thermal expansion of the polymer film.

When provided outside the polymer film, the container preferably has air permeability, and more preferably has an opening for ventilation in at least part thereof. By allowing the external tube to have air permeability, a produced decomposition gas can be easily discharged, and therefore fusion bonding can be further suppressed. A material of the external tube is required, for example, to withstand continuous use at 500° C. or higher.

Examples of a material of the container that satisfies such a requirement include ceramics such as alumina ($Al_2O_3$), zirconia ($ZrO_2$), quartz ($SiO_2$), silicon carbide (SiC), titania ($TiO_2$), magnesia (MgO), silicon nitride ($Si_3N_4$), aluminum nitride (AlN), yttria ($Y_2O_3$), mullite ($3Al_2O_3.2SiO_2$), cordierite ($2MgO.2Al_2O_3.5SiO_2$), steatite ($MgO.SiO_2$), and forsterite ($2MgO.SiO_2$). When a carbonization step and a graphitization step are continuously performed, a material that can withstand continuous use at 2000° C. or higher, preferably 2800° C. or higher is preferably used. Examples of such a material include a C/C composite material obtained by reinforcing graphite with carbon fibers and an isotropic graphite material such as an extrusion-molded article, a diemolded article, or a cold isostatically pressed article. Alternatively, a soft material such as a graphite film or a woven fabric or felt of carbon fibers may be wound into a tube. The shape of the external tube is not particularly limited, but the inner surface of the external tube preferably has less surface irregularities because there is a high possibility that the inner surface of the external tube comes into contact with the polymer film. Further, the external tube preferably has a cross-sectional shape close to a circle.

The cross-sectional shape of the inner surface may be a rectangle, and the inner surface does not always need to be continuous. For example, a plurality of rings may surround the outer periphery of the roll of polymer film, or a plurality of rod-shaped members may be arranged.

(Orientation of Polymer Film)

In the present invention, the orientation of the roll of polymer film may be horizontal or vertical. When the orientation of the roll of polymer film is horizontal, the roll of polymer film having a gap(s) hangs down. However, fusion bonding can be improved because the roll of polymer film has a gap(s) previously formed according to the present invention.

(Width of Polymer Film)

The width of the polymer film to be used in the present invention is not particularly limited, but is preferably 150 mm or more, more preferably 250 mm or more, even more preferably 500 mm or more. When the width of the polymer film is 150 mm or more, fusion bonding is usually likely to occur. However, fusion bonding can be effectively suppressed by using the production method according to the present invention.

EXAMPLES

Evaluations (Fusion Bonding)

Evaluation of the occurrence of fusion bonding was made on a roll of carbonaceous film according to the following criteria: "A" the occurrence of fusion bonding was not observed; "B" the occurrence of fusion bonding was observed in 3 to 9 layers; "C" the occurrence of fusion bonding was observed in 10 to 14 layers; "D" the occurrence of fusion bonding was observed in 15 to 19 layers; and "E" the occurrence of fusion bonding was observed in 20 or more layers.

Similarly, evaluation of the occurrence of fusion bonding was made on a roll of graphite film according to the following criteria: "A" the occurrence of fusion bonding was not observed; "B" the occurrence of fusion bonding was observed in 3 to 9 layers; "C" the occurrence of fusion bonding was observed in 10 to 14 layers; "D" the occurrence of fusion bonding was observed in 15 to 19 layers; and "E" the occurrence of fusion bonding was observed in 20 or more layers.

(Rippling)

Figure 2:
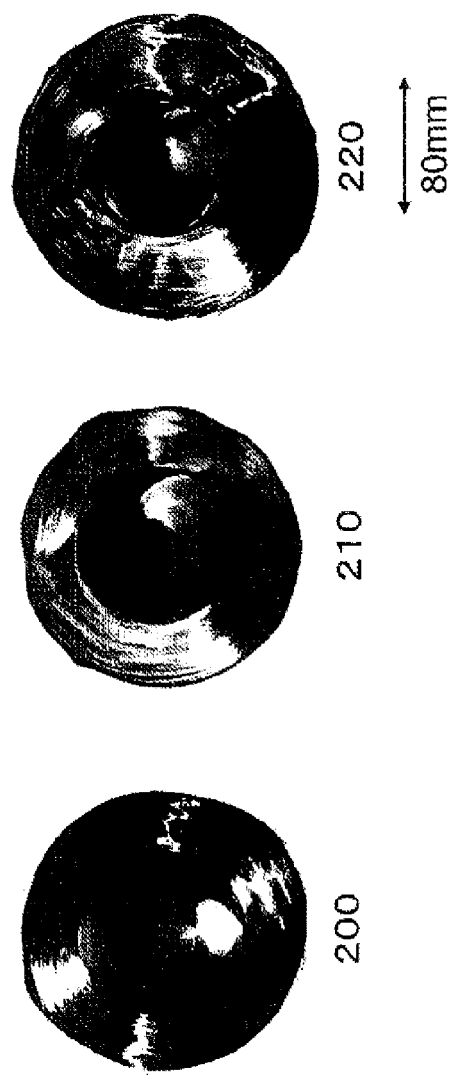
FIG. 2 is a drawing illustrating rippling of a carbonaceous film according to the present invention.

Evaluation of the occurrence of rippling was made on a roll of carbonaceous film according to the following criteria: "A" the degree of rippling at the end of the roll is equal to or less than that at the end of a roll 200 shown in FIG. 2; "B" the degree of rippling at the end of the roll is greater than that at the end of the roll 200 but equal to or less than that at the end of a roll 210 shown in FIG. 2; "C" the degree of rippling at the end of the roll is greater than that at the end of the roll 210 but equal to or less than that at the end of a roll 220 shown in FIG. 2; and "D" the degree of rippling at the end of the roll is greater than that at the end of the roll 220.

Similarly, evaluation of the occurrence of rippling was made on a roll of graphite film according to the following criteria: "A" the degree of rippling at the end of the roll is equal to or less than that at the end of a roll 200 shown in FIG. 2; "B" the degree of rippling at the end of the roll is greater than that at the end of the roll 200 but equal to or less than that at the end of a roll 210 shown in FIG. 2; and "C" the degree of rippling at the end of the roll is greater than that at the end of the roll 210.

(Method for Measuring Gap Between Layers of Polymer Film)

(Method for Measuring Ts/Tf)

<1> When a winding core was present, the outer diameter (Rs) of the winding core was measured (hereinafter, the winding core is also referred to as "core").

<2> The end of outermost layer of a roll of polymer film 52 was fixed so as not to move, and then the inner diameter (Ra) and the outer diameter (Rb) of the roll of polymer film were measured. In the measurement of Ra and Rb, as shown in FIG. 7, an average of the length of a line segment on a straight line passing through the center of the roll of polymer film 52 and the outermost end of the roll of polymer film 52 and the length of a line segment on a straight line orthogonal to the above straight line was used.

It is to be noted that when a diameter or a thickness related to the roll of polymer film was measured in the present invention, as described above, an average of the length of a line segment on a straight line passing through the center of the roll of polymer film 52 and the outermost end of the roll of polymer film 52 and the length of a line segment on a straight line orthogonal to the above straight line was always used.

<3> When a gap(s) was(were) present inside the roll of polymer film 52, the value of Ts/Tf was determined in the following manner. The polymer film was wound around a core 110, provided inside the innermost layer of the roll of polymer film 52, from the inner end thereof while a tension of 10 N/m or more was applied thereto so that no gap was formed between the layers of the polymer film (FIG. 8). While the polymer film was wound around the core in such a way, a thickness 610(A) of layers of a polymer film 51 wound around the core and a thickness 600(B) of the roll of polymer film 52, located outside the polymer film 51 wound around the core, after winding the polymer film around the core were measured every time the number of layers of the polymer film rewound from the roll of polymer film 52 reached 10 after the roll of polymer film 52 was started to be rewound from the inner side thereof.

Here, when the thickness of layers of the polymer film 51 wound around the core at the time when the first 10 layers of the roll of polymer film 52 were rewound is defined as $A_1$, the thickness of layers of the polymer film 51 wound around the core at the time when 10 n layers of the roll of polymer film 52 were rewound is represented as $A_n$. Similarly, the thickness of the roll of polymer film 52 after winding the polymer film around the core at the time when 10 n layers were rewound is represented as $B_n$.

The measurement of thickness was made using a calibrated vernier caliper by bringing the vernier caliper into contact with the polymer film without applying pressure on the polymer film. The thickness of the roll of polymer film 52 was measured at four points at which mutually-orthogonal straight lines passing through the center of the roll of polymer film 52 intersect with the roll of polymer film 52, and an average of the measurements was used as the thickness of the roll of polymer film 52.

<4> The polymer film 51 wound around the core had the same cross-sectional area as the polymer film rewound from the roll of polymer film 52, and therefore the cross-sectional area of the gap(s) (space) formed between the layers of the polymer film was determined by calculating a difference between the cross-sectional area of a portion where the polymer film was rewound from the roll of polymer film 52 and the cross-sectional area of a portion where the polymer film was wound around the core. Further, the cross-sectional area of the gap(s) formed between the layers of the polymer film was divided by the cross-sectional area of the polymer film as the formula below to determine the ratio of the gap(s) formed per length of 10 layers of the polymer film (i.e., Ts/Tf). It is to be noted that the values of the ratio may be graphed to determine the ratio of the gap(s) present between the inner end and the specific point (e.g., between the inner end and the 50% film length point) of the entire polymer film.

$$T_s/T_f = ((Ra/2+B_n)^2\pi - (Ra/2+B_{n-1})^2\pi - ((Rs/2+A_n)^2\pi - (Rs/2+A_{n-1})^2\pi))/((Rs/2+A_n)^2\pi - (Rs/2+A_n)^2\pi)) \quad \text{[Formula 2]}$$

<5> Finally, the thickness of layers of the polymer film wound around the core was measured after the entire polymer film was wound around the core without forming any gap to determine the cross-sectional area of the entire roll of polymer film having no gap.

By determining the cross-sectional area of the entire roll of polymer film, it is also possible to determine a point 50% of the total film length away from the end of the innermost layer of the roll of polymer film and therefore to determine the ratio of the gap(s) formed between the end of the innermost layer and the 50% film length point of the roll of polymer film.

It is to be noted that when the number of turns of the roll of polymer film was not increased by ½ turn or more even by rewinding the polymer film wound around the core with a tension of 10 N/m to tighten the roll of polymer film, the roll of polymer film was considered to have no gap.

Further, when no gap was provided on the inner peripheral side of the roll of polymer film, the roll of polymer film was considered to have a gap(s) at and beyond a point at which, when the polymer film was rewound with a tension of 10 N/m or more to tighten the roll of polymer film, the roll of polymer film was started to be tightened, and then measurements were performed in the same manner as in <1> to <5>.

Example 1

Figure 3:
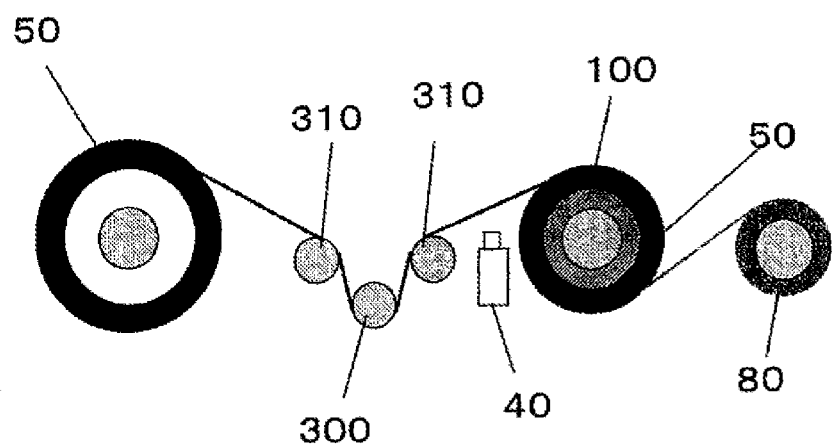
FIG. 3 is a drawing illustrating rewinding of a polymer film according to Example 1 of the present invention.
Figure 4:
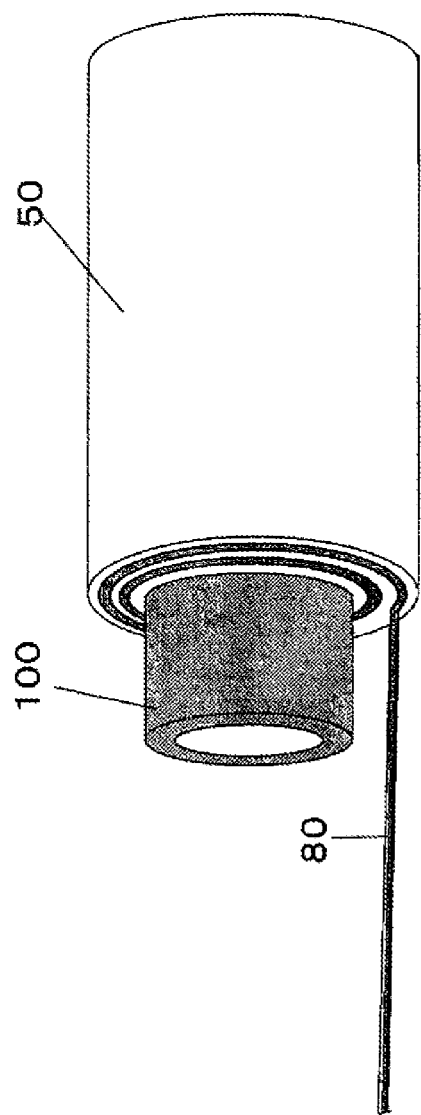
FIG. 4 is a drawing illustrating a method for removing a slip sheet according to Example 1 of the present invention.

A polyimide film (trade name: APICAL 75AH film, thickness: 75 μm) manufactured by Kaneka Corporation and having a width of 250 mm and a length of 50 m was prepared as a polymer film 50, and a PET film (thickness: 25 μm) having a width of 25 mm and a length of 50 m was prepared as a slip sheet 80. As shown in FIG. 3, the polymer film 50 and the slip sheet 80 were rewound around a core 100 having a diameter of 100 mm. At this time, two rolls of the slip sheet were prepared, and the polymer film was wound up together with the two slip sheets in such a manner that the slip sheets were provided on both end sides of the polymer film. As shown in FIG. 3, both the polymer film and the slip sheet were wound up under conditions of a tension of 20 N/m and a winding speed of 10 m/min while one of the surfaces of the film was diselectrified by a diselectrifier 40. It is to be noted that the tension was detected using a pick-up roller 300 shown in FIG. 3. After the completion of winding, the outermost layer of the roll of polymer film was fixed with an adhesive tape to prevent loosening, and the slip sheets 80 were started to be removed from the outer peripheral side of the roll of polymer film as shown in FIG. 4 to form gaps between the layers of the polymer film. Just after the formation of gaps, all the gaps formed between the layers of the polymer film had a uniform size of 25 μm±2.0 μm.

Figure 5:
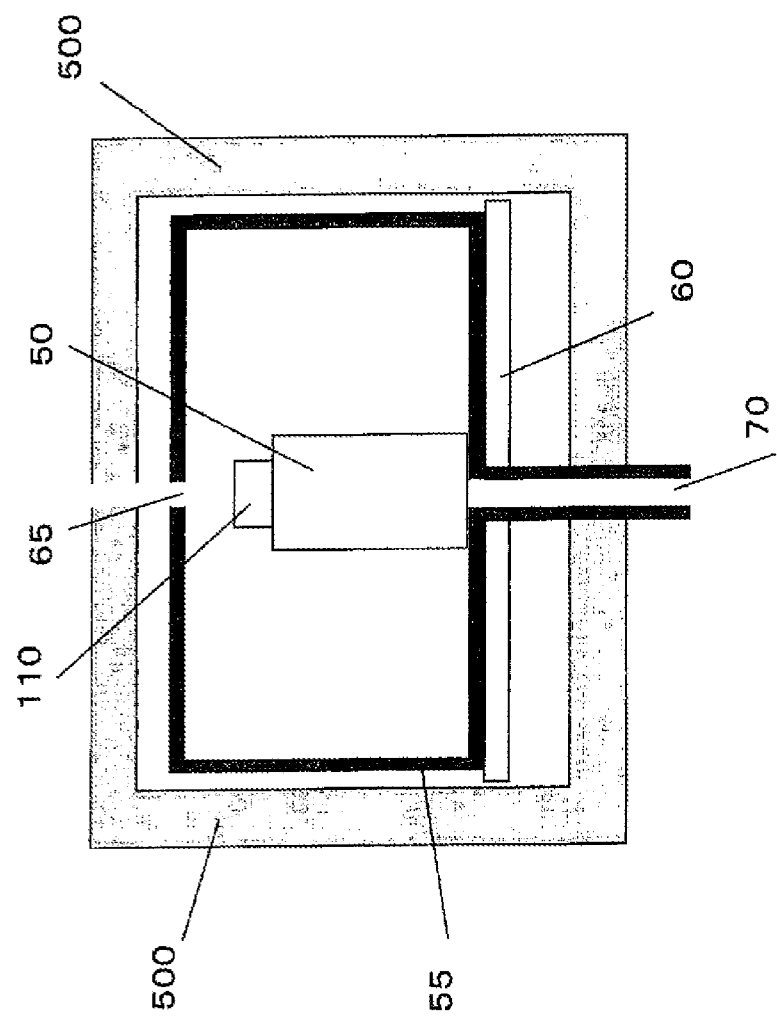
FIG. 5 is a drawing illustrating a heat treatment method according to Example 1 of the present invention.

Then, the roll of polymer film having gaps was vertically set together with the core 100 in an indirect heating furnace as shown in FIG. 5, and the adhesive tape used to fix the outermost layer of the roll of polymer film was removed. It is to be noted that at this time, the roll of polymer film was set so that the end thereof was flat without irregularities. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. At this time, the nitrogen gas was introduced through an inlet port 65, and therefore exhaust was directed toward a pipe 70. Results are shown in Table 1.

Example 2

Example 2 was performed in the same manner as in Example 1 except that a PET film (thickness: 50 μm) having a width of 25 mm and a length of 50 m was used as the slip sheet 80. Just after the formation of gaps, all the gaps formed between the layers of the polymer film had a uniform size of 50 μm±2.0 μm. Results are shown in Table 1.

Example 3

Example 3 was performed in the same manner as in Example 1 except that a PET film (thickness: 75 μm) having a width of 25 mm and a length of 50 m was used as the slip sheet 80. Just after the formation of gaps, all the gaps formed between the layers of the polymer film had a uniform size of 75 μm±2.0 Results are shown in Table 1.

Example 4

Example 4 was performed in the same manner as in Example 1 except that a polyimide film (trade name: APICAL 200AV film, thickness: 50 μm) manufactured by Kaneka Corporation and having a width of 250 mm and a length of 50 m was used as the polymer film 50. Just after the formation of gaps, all the gaps formed between the layers of the polymer film had a uniform size of 25 μm±2.0 μm. Results are shown in Table 1.

Example 5

Example 5 was performed in the same manner as in Example 1 except that a polyimide film (trade name: APICAL 200AV film, thickness: 50 μm) manufactured by Kaneka Corporation and having a width of 250 mm and a length of 50 m was used as the polymer film 50 and that a PET film (thickness: 37 μm) having a width of 25 mm and a length of 50 m was used as the slip sheet 80. Just after the formation of gaps, all the gaps formed between the layers of the polymer film had a uniform size of 37 μm±2.0 μm. Results are shown in Table 1.

Example 6

Example 6 was performed in the same manner as in Example 1 except that a polyimide film (trade name: APICAL 200AV film, thickness: 50 μm) manufactured by Kaneka Corporation and having a width of 250 mm and a length of 50 m was used as the polymer film 50 and that a PET film (thickness: 50 μm) having a width of 25 mm and a length of 50 m was used as the slip sheet 80. Just after the formation of gaps, all the gaps formed between the layers of the polymer film had a uniform size of 50 μm±2.0 μm. Results are shown in Table 1.

Example 7

Example 7 was performed in the same manner as in Example 1 except that a polyimide film (trade name: APICAL 200AV film, thickness: 50 μm) manufactured by Kaneka Corporation and having a width of 250 mm and a length of 50 m was used as the polymer film 50 and that a PET film (thickness: 75 μm) having a width of 25 mm and a length of 50 m was used as the slip sheet 80. Just after the formation of gaps, all the gaps formed between the layers of the polymer film had a uniform size of 75 μm±2.0 μm. Results are shown in Table 1.

Comparative Example 1

Figure 6:
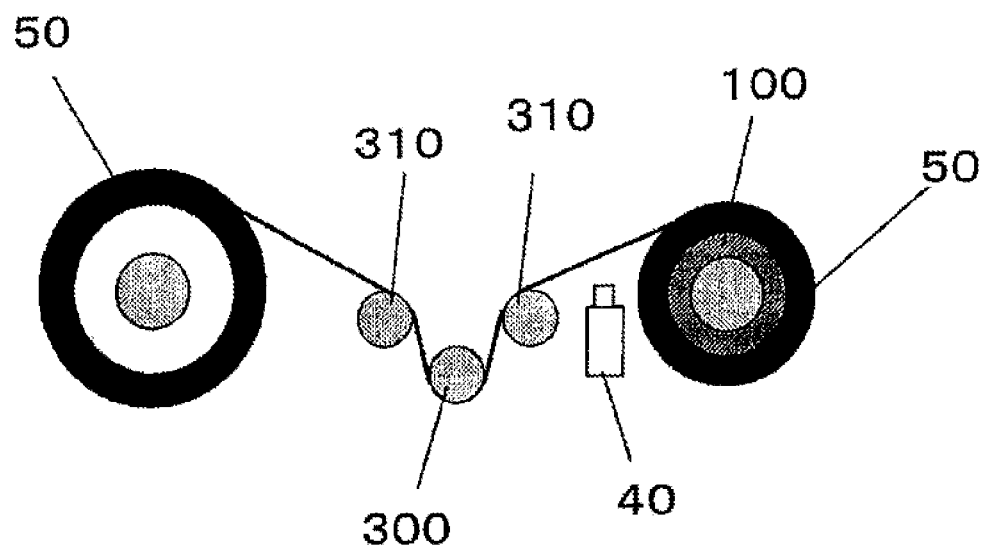
FIG. 6 is a drawing illustrating rewinding of a polymer film according to Comparative Example 1 of the present invention.

A polyimide film (trade name: APICAL 75AH film, thickness: 75 μm) manufactured by Kaneka Corporation and having a width of 250 mm and a length of 50 m was prepared as a polymer film 50, and as shown in FIG. 6, the polymer film 50 was rewound around a core 100 having a diameter of 100 mm. As shown in FIG. 6, the polymer film 50 was wound up under conditions of a tension of 80 N/m and a winding speed of 10 m/min while one of the surfaces of the film was dielectrified by a dielectrifier 40. It is to be noted that the tension was detected using a pick-up roller 300 shown in FIG. 6. After the completion of winding, as shown in FIG. 5, the roll of polymer film was vertically set together with the core 100 in an indirect heating furnace. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. At this time, the nitrogen gas was introduced through an inlet port 65, and therefore exhaust was directed toward a pipe 70. Results are shown in Table 1.

TABLE 1

| | Polymer film | | | Inner diameter of roll mm | Outer diameter of core mm | Gap formation method | Gap between layers of film (Ts) | | | Location where gaps were formed |
|---|---|---|---|---|---|---|---|---|---|---|
| | Thickness (Tf) μm | Length m | Width mm | | | | Gap (Ts) μm | Ts/Tf | Gap formation ratio % | |
| Example 1 | 75 | 50 | 250 | 100 | 100 | Insertion of slip sheet | 25 | 0.33 | 100 | Entire roll |
| Example 2 | 75 | 50 | 250 | 100 | 100 | Insertion of slip sheet | 50 | 0.67 | 100 | Entire roll |
| Example 3 | 75 | 50 | 250 | 100 | 100 | Insertion of slip sheet | 75 | 1.00 | 100 | Entire roll |
| Example 4 | 50 | 50 | 250 | 100 | 100 | Insertion of slip sheet | 25 | 0.50 | 100 | Entire roll |
| Example 5 | 50 | 50 | 250 | 100 | 100 | Insertion of slip sheet | 37 | 0.74 | 100 | Entire roll |
| Example 6 | 50 | 50 | 250 | 100 | 100 | Insertion of slip sheet | 50 | 1.00 | 100 | Entire roll |
| Example 7 | 50 | 50 | 250 | 100 | 100 | Insertion of slip sheet | 75 | 1.50 | 100 | Entire roll |
| Comparative Example 1 | 75 | 50 | 250 | 100 | 100 | — | 0 | — | 0 | — |

| | Pressure reduction at and below 450° C. | Introduction of nitrogen at and above pyrolysis onset temperature | Orientation of roll of polymer film in furnace | Evaluations | | | | |
|---|---|---|---|---|---|---|---|---|
| | | | | Carbonaceous film | | | Graphite film | |
| | | | | Fusion bonding | | | Fusion bonding | |
| | | | | Number of layers where fusion bonding occurred | Rippling | | Number of layers where fusion bonding occurred | Rippling |
| Example 1 | Not performed | Performed | Vertical | 10 | C | A | 10 | C | A |
| Example 2 | Not performed | Performed | Vertical | 0 | A | A | 0 | A | A |
| Example 3 | Not performed | Performed | Vertical | 0 | A | B | 0 | A | B |
| Example 4 | Not performed | Performed | Vertical | 5 | B | A | 5 | B | A |
| Example 5 | Not performed | Performed | Vertical | 0 | A | A | 0 | A | A |
| Example 6 | Not performed | Performed | Vertical | 0 | A | B | 0 | A | B |
| Example 7 | Not performed | Performed | Vertical | 0 | A | C | 0 | A | C |
| Comparative Example 1 | Not performed | Performed | Vertical | 20 | E | B | 20 | E | B |

It was found that fusion bonding was significantly improved in Examples 1 to 7 in which gaps were formed between the layers of the polymer film as compared to Comparative Example 1 in which no gap was formed between the layers of the polymer film. As a result of comparison among Examples 1 to 7 based on the size of gaps, fusion bonding occurred in 10 layers of the polymer film in Example 1 in which the value of Tf/Ts was 0.33, but fusion bonding did not occur in Example 2 in which the value of Tf/Ts was 0.67 and in Example 3 in which the value of Tf/Ts was 1.00. However, rippling slightly occurred in Example 3 in which the value of Tf/Ts was 1.00. This is because the size of gaps was slightly large and therefore space that allowed the polymer film to be deformed during carbonization shrinkage was given. Further, the relationship between the size of gaps and the occurrence of fusion bonding and rippling in Examples 4 to 7 in which the polymer film had a thickness of 50 μm showed a similar tendency to that in Examples 1 to 3. More specifically, fusion bonding occurred in 5 layers of the polymer film in Example 4 in which the value of Tf/Ts was 0.50, but fusion bonding did not occur in Examples 5 to 7 in which the value of Tf/Ts was higher than 0.50. However, rippling slightly occurred in Example 6 in which the value of Tf/Ts was 1.00, and the degree of rippling was greater when the value of Tf/Ts was as high as 1.50.

Example 8

Example 8 was performed in the same manner as in Example 2 except that the first 38 m of the polymer film was wound up together with the two slip sheets so that the slip sheets were inserted between the layers of the polymer film and the last 12 m of the polymer film was wound up without using a slip sheet. Just after the formation of gaps, all the gaps formed between the layers of the polymer film in the inner peripheral-side three-quarters of the roll of polymer film had a uniform size of 50 μm±2.0 μm. Results are shown in Table 2. The value of Ts/Tf of part of the roll of polymer film where gaps were formed (part from the end of the innermost layer to the 75% film length point of the roll of polymer film) was 0.67 and the value of Ts/Tf of the entire roll of polymer film was 0.50.

Example 9

Example 9 was performed in the same manner as in Example 2 except that the first 25 m of the polymer film was wound up together with the two slip sheets so that the slip sheets were inserted between the layers of the polymer film and the last 25 m of the polymer film was wound up without using a slip sheet. Just after the formation of gaps, all the gaps formed between the layers of the polymer film in the inner peripheral-side half of the roll of polymer film had a uniform size of 50 μm±2.0 μm. Results are shown in Table 2. The value of Ts/Tf of part of the roll of polymer film where gaps were formed (part from the end of the innermost layer to the 50% film length point of the roll of polymer film) was 0.67 and the value of Ts/Tf of the entire roll of polymer film was 0.33.

Example 10

Example 10 was performed in the same manner as in Example 2 except that the first 15 m of the polymer film was wound up together with the two slip sheets so that the slip sheets were inserted between the layers of the polymer film and the last 35 m of the polymer film was wound up without using a slip sheet. Just after the formation of gaps, all the gaps formed between the layers of the polymer film in the inner peripheral-side three-tenths of the roll of polymer film had a uniform size of 50 μm±2.0 μm. Results are shown in Table 2. The value of Ts/Tf of part of the roll of polymer film where gaps were formed (part from the end of the innermost layer to the 30% film length point of the roll of polymer film) was 0.67 and the value of Ts/Tf of the entire roll of polymer film was 0.20.

Example 11

Example 11 was performed in the same manner as in Example 2 except that the first 25 m of the polymer film was wound up without using a slip sheet and the last 25 m of the polymer film was wound up together with the two slip sheets so that the slip sheets were inserted between the layers of the polymer film. Just after the formation of gaps, all the gaps formed between the layers of the polymer film in the outer peripheral-side half of the roll of polymer film had a uniform size of 50 μm±2.0 μm. Results are shown in Table 2. The value of Ts/Tf of part of the roll of polymer film where gaps were formed (part from the 50% film length point to the end of the outermost layer of the roll of polymer film) was 0.67 and the value of Ts/Tf of the entire roll of polymer film was 0.33.

TABLE 2

| | Polymer film | | | Inner diameter of roll mm | Outer diameter of core mm | Gap between layers of film (Ts) | | | | |
| --- | --- | --- | --- | --- | --- | --- | --- | --- | --- | --- |
| | Thickness (Tf) μm | Length m | Width mm | | | Gap formation method | Gap (Ts) μm | Ts/Tf of only part where gaps were formed | Gap formation ratio % | Location where gaps were formed |
| Example 2 | 75 | 50 | 250 | 100 | 100 | Insertion of slip sheet | 50 | 0.67 | 100 | Entire roll |
| Example 8 | 75 | 50 | 250 | 100 | 100 | Insertion of slip sheet | 50 | 0.67 | 75 | From end of innermost layer |
| Example 9 | 75 | 50 | 250 | 100 | 100 | Insertion of slip sheet | 50 | 0.67 | 50 | From end of innermost layer |
| Example 10 | 75 | 50 | 250 | 100 | 100 | Insertion of slip sheet | 50 | 0.67 | 30 | From end of innermost layer |
| Example 11 | 75 | 50 | 250 | 100 | 100 | Insertion of slip sheet | 50 | 0.67 | 50 | From end of outermost layer |

TABLE 2-continued

| | Pressure reduction at and below 450° C. | Introduction of nitrogen at and above pyrolysis onset temperature | Orientation of roll of polymer film in furnace | Evaluations | | | | | |
|---|---|---|---|---|---|---|---|---|---|
| | | | | Carbonaceous film | | | Graphite film | | |
| | | | | Fusion bonding | | | Fusion bonding | | |
| | | | | Number of layers where fusion bonding occurred | | Rippling | Number of layers where fusion bonding occurred | | Rippling |
| Example 2 | Not performed | Performed | Vertical | 0 | A | A | 0 | A | A |
| Example 8 | Not performed | Performed | Vertical | 0 | A | A | 0 | A | A |
| Example 9 | Not performed | Performed | Vertical | 0 | A | A | 0 | A | A |
| Example 10 | Not performed | Performed | Vertical | 8 | B | A | 8 | B | A |
| Example 11 | Not performed | Performed | Vertical | 10 | C | A | 10 | C | A |

It was found from the results of Examples 9 and 11 that when gaps were partially provided in the roll of polymer film, fusion bonding could be improved by providing gaps on the inner peripheral side of the roll of polymer film. As can be seen from the results of Examples 2 and 8 to 10, the gap formation ratio is preferably 30% or higher, and fusion bonding did not occur in Examples 2, 8, and 9 in which the gap formation ratio was 50% or higher.

Example 12

Example 12 was performed in the same manner as in Example 2 except that after the furnace was filled with nitrogen gas at room temperature, heat treatment was performed without introducing nitrogen gas to increase the temperature in the furnace from room temperature to 1000° C. Just after the formation of gaps, all the gaps formed between the layers of the polymer film had a uniform size of 50 µm±2.0 µm. Results are shown in Table 3.

Example 13

Example 13 was performed in the same manner as in Example 2 except that heat treatment was performed to increase the temperature in the furnace from room temperature to 450° C. while the pressure in the furnace was reduced to 0.04 kPa (absolute pressure) and then nitrogen gas was introduced at 450° C. to return the pressure in the furnace to atmospheric pressure and heat treatment was performed to increase the temperature in the furnace to 1000° C. while nitrogen gas was introduced at a flow rate of 5 L/min. Just after the formation of gaps, all the gaps formed between the layers of the polymer film had a uniform size of 50 µm±2.0 µm. Results are shown in Table 3.

TABLE 3

| | Polymer film | | | Inner diameter of roll mm | Outer diameter of core mm | Gap between layers of film (Ts) | | | | |
|---|---|---|---|---|---|---|---|---|---|---|
| | Thickness (Tf) µm | Length m | Width mm | | | Gap formation method | Gap (Ts) µm | Ts/Tf | Gap formation ratio % | Location where gaps were formed |
| Example 2 | 75 | 50 | 250 | 100 | 100 | Insertion of slip sheet | 50 | 0.67 | 100 | Entire roll |
| Example 12 | 75 | 50 | 250 | 100 | 100 | Insertion of slip sheet | 50 | 0.57 | 100 | Entire roll |
| Example 13 | 75 | 50 | 250 | 100 | 100 | Insertion of slip sheet | 50 | 0.67 | 100 | Entire roll |

| | Pressure reduction at and below 450° C. | Introduction of nitrogen at and above pyrolysis onset temperature | Orientation of roll of polymer film in furnace | Evaluations | | | | | |
|---|---|---|---|---|---|---|---|---|---|
| | | | | Carbonaceous film | | | Graphite film | | |
| | | | | Fusion bonding | | | Fusion bonding | | |
| | | | | Number of layers where fusion bonding occurred | | Rippling | Number of layers where fusion bonding occurred | | Rippling |
| Example 2 | Not performed | Performed | Vertical | 0 | A | A | 0 | A | A |
| Example 12 | Not performed | Not performed | Vertical | 3 | B | A | 3 | B | A |
| Example 13 | Performed | Performed | Vertical | 0 | A | A | 0 | A | A |

Fusion bonding did not occur in Example 2 in which heat treatment was performed at a temperature equal to or higher than the pyrolysis onset temperature of the polymer film while nitrogen was introduced, but fusion bonding slightly occurred in Example 12 in which heat treatment was performed at a temperature equal to or higher than the pyrolysis onset temperature of the polymer film without introducing nitrogen. It is to be noted that as in the case of Example 2 in which heat treatment at and below 450° C. was performed at ordinary pressure, fusion bonding did not occur in Example 13 in which heat treatment at and below 450° C. before carbonization/decomposition was performed under a reduced pressure. From this, it is considered that when a roll of polymer film has no gap between the layers of the polymer film before heat treatment, gaps are formed between the layers of the polymer film by reducing the pressure in the process of heat treatment because the roll of polymer film is loosened by, for example, the expansion of air between the layers of the polymer film, and on the other hand, when a roll of polymer film has gaps between the layers of the polymer film before heat treatment, the gaps rarely become too large because air between the layers of the polymer film escapes through the gaps to the outside of the roll of polymer film, and therefore carbonization successfully proceeds.

0.04 kPa (absolute pressure)) by electrically heating a heater 500 provided outside the roll of polymer film to increase the temperature in the furnace from room temperature to 450° C. so that gaps were provided between the layers of the polymer film, and then nitrogen was introduced at 450° C. to return the pressure in the furnace to atmospheric pressure and heat treatment was performed to increase the temperature in the furnace to 1000° C. while nitrogen gas was introduced at a flow rate of 5 L/min. At this time, the nitrogen gas was introduced through an inlet port 65, and therefore exhaust was directed toward a pipe 70. Results are shown in Table 4.

TABLE 4

| | Polymer film | | | Inner diameter of roll mm | Outer diameter of core mm | Gap between layers of film (Ts) | | | | |
|---|---|---|---|---|---|---|---|---|---|---|
| | Thickness (Tf) μm | Length m | Width mm | | | Gap formation method | Gap (Ts) μm | Ts/Tf | Gap formation ratio % | Location where gaps were formed |
| Example 2 | 75 | 50 | 250 | 100 | 100 | Insertion of slip sheet | 50 | 0.67 | 100 | Entire roll |
| Example 14 | 75 | 50 | 250 | 100 | 100 | Pressure reduction | 50 | 0.67 | 100 | Entire roll |

| | Introduction | | | Evaluations | | | | | |
|---|---|---|---|---|---|---|---|---|---|
| | Pressure reduction at and below 450° C. | of nitrogen at and above pyrolysis onset temperature | Orientation of roll of polymer film in furnace | Carbonaceous film | | | Graphite film | | |
| | | | | Fusion bonding | | | Fusion bonding | | |
| | | | | Number of layers where fusion bonding occurred | | Rippling | Number of layers where fusion bonding occurred | | Rippling |
| Example 2 | Not performed | Performed | Vertical | 0 | A | A | 0 | A | A |
| Example 14 | Performed | Performed | Vertical | 0 | A | B | 0 | A | B |

Fusion bonding did not occur both in Example 14 in which gaps between the layer of the polymer film were formed by heat treatment from room temperature to 450° C. under a reduced pressure and in Example 2 in which gaps between the layers of the polymer film were formed by winding up the polymer film together with a slip sheet so that the slip sheet was inserted between the layers of the polymer film and then removing the slip sheet. However, rippling slightly occurred in the case of Example 14 in which gaps were formed by pressure reduction, whereas rippling did not occur when gaps were formed by inserting and then removing a slip sheet. The reason for this is considered to be that more uniform gaps can be stably formed by a method in which gaps are formed by inserting and then removing a slip sheet.

Example 14

A polyimide film (trade name: APICAL 75AH film, thickness: 75 μm) manufactured by Kaneka Corporation and having a width of 250 mm and a length of 50 m was prepared as a polymer film 50, and as shown in FIG. 6, the polymer film 50 was rewound around a core 100 having a diameter of 100 mm. As shown in FIG. 6, the polymer film 50 was wound up under conditions of a tension of 80 N/m and a winding speed of 10 m/min while one of the surfaces of the film was dielectrified by a dielectrifier 40. It is to be noted that the tension was detected using a pick-up roller 300 shown in FIG. 6. After the completion of winding, as shown in FIG. 5, the roll of polymer film was vertically set together with the core 100 in an indirect heating furnace. The roll of polymer film was heat-treated under a reduced pressure (at a furnace pressure of Example 15

Example 15 was performed in the same manner as in Example 2 except that a polyimide film (trade name: APICAL 75AH film, thickness: 75 μm) manufactured by Kaneka Corporation and having a width of 100 mm and a length of 50 m was used as the polymer film 50. Just after the formation of gaps, all the gaps formed between the layers of the polymer film had a uniform size of 50 μm±2.0 μm. Results are shown in Table 5.

Example 16

Example 16 was performed in the same manner as in Example 2 except that a polyimide film (trade name: APICAL 75AH film, thickness: 75 μm) manufactured by Kaneka Corporation and having a width of 500 mm and a length of 50 m was used as the polymer film 50. Just after the formation of gaps, all the gaps formed between the layers of the polymer film had a uniform size of 50 μm±2.0 μm. Results are shown in Table 5.

Example 17

Example 17 was performed in the same manner as in Example 2 except that a polyimide film (trade name: APICAL 75AH film, thickness: 75 μm) manufactured by Kaneka Corporation and having a width of 600 mm and a length of 50 m was used as the polymer film 50. Just after the formation of gaps, all the gaps formed between the layers of the polymer film had a uniform size of 50 μm±2.0 μm. Results are shown in Table 5.

Comparative Example 2

Comparative Example 2 was performed in the same manner as in Comparative Example 1 except that a polyimide film (trade name: APICAL 75AH film, thickness: 75 μm) manufactured by Kaneka Corporation and having a width of 100 mm and a length of 50 m was used as the polymer film 50. Results are shown in Table 5.

Comparative Example 3

Comparative Example 3 was performed in the same manner as in Comparative Example 1 except that a polyimide film (trade name: APICAL 75AH film, thickness: 75 μm) manufactured by Kaneka Corporation and having a width of 500 mm and a length of 50 m was used as the polymer film 50. Results are shown in Table 5.

Comparative Example 4

Comparative Example 4 was performed in the same manner as in Comparative Example 1 except that a polyimide film (trade name: APICAL 75AH film, thickness: 75 μm) manufactured by Kaneka Corporation and having a width of 600 mm and a length of 50 m was used as the polymer film 50. Results are shown in Table 5.

TABLE 5

| | Polymer film | | | Inner diameter of roll mm | Outer diameter of core mm | Gap between layers of film (Ts) | | | | |
|---|---|---|---|---|---|---|---|---|---|---|
| | Thickness (Tf) μm | Length m | Width mm | | | Gap formation method | Gap (Ts) μm | Ts/Tf | Gap formation ratio % | Location where gaps were formed |
| Example 15 | 75 | 50 | 100 | 100 | 100 | Insertion of slip sheet | 50 | 0.67 | 100 | Entire roll |
| Comparative Example 2 | 75 | 50 | 100 | 100 | 100 | — | 0 | — | 0 | — |
| Example 2 | 75 | 50 | 250 | 100 | 100 | Insertion of slip sheet | 50 | 0.67 | 100 | Entire roll |
| Comparative Example 1 | 75 | 50 | 250 | 100 | 100 | — | 0 | — | 0 | — |
| Example 16 | 75 | 50 | 500 | 100 | 100 | Insertion of slip sheet | 50 | 0.67 | 100 | Entire roll |
| Comparative Example 3 | 75 | 50 | 500 | 100 | 100 | — | 0 | — | 0 | — |
| Example 17 | 75 | 50 | 600 | 100 | 100 | Insertion of slip sheet | 50 | 0.67 | 100 | Entire roll |
| Comparative Example 4 | 75 | 50 | 600 | 100 | 100 | — | 0 | — | 0 | — |

| | Introduction | | | Evaluations | | | | | |
|---|---|---|---|---|---|---|---|---|---|
| | Pressure reduction at and below 450° C. | of nitrogen at and above pyrolysis onset temperature | Orientation of roll of polymer film in furnace | Carbonaceous film Fusion bonding | | | Graphite film Fusion bonding | | |
| | | | | Number of layers where fusion bonding occurred | | Rippling | Number of layers where fusion bonding occurred | | Rippling |
| Example 15 | Not performed | Performed | Vertical | 0 | A | A | 0 | A | A |
| Comparative Example 2 | Not performed | Performed | Vertical | 5 | B | B | 5 | B | B |
| Example 2 | Not performed | Performed | Vertical | 0 | A | A | 0 | A | A |
| Comparative Example 1 | Not performed | Performed | Vertical | 20 | E | B | 20 | E | B |
| Example 16 | Not performed | Performed | Vertical | 0 | A | A | 0 | A | A |
| Comparative Example 3 | Not performed | Performed | Vertical | 30 | E | B | 30 | E | B |

TABLE 5-continued

| | | | | | | | | | | |
|---|---|---|---|---|---|---|---|---|---|---|
| Example 17 | Not performed | Performed | Vertical | 0 | A | B | 0 | A | B |
| Comparative Example 4 | Not performed | Performed | Vertical | 35 | E | C | 35 | E | C |

As shown in Table 5, comparisons between cases where gaps were formed between the layers of the polymer film and where no gap was formed were made by changing the width of the polymer film from 100 mm to 600 mm. It was found from the results of Comparative Examples 1 to 4 that when no gap was formed between the layers of the polymer film and the polymer film had a width larger than 100 mm, fusion bonding occurred in an extremely large number of layers of the polymer film. However, in Examples 2 and 15 to 17, fusion bonding could be effectively suppressed by previously forming gaps between the layers of the polymer film.

Example 18

Example 18 was performed in the same manner as in Example 2 except that a polyimide film (trade name: APICAL 75AH film, thickness: 75 μm) manufactured by Kaneka Corporation and having a width of 250 mm and a length of 100 m was used as the polymer film 50. Just after the formation of gaps, all the gaps formed between the layers of the polymer film had a uniform size of 75 μm±2.0 μm. Results are shown in Table 6.

Comparative Example 5

Comparative Example 5 was performed in the same manner as in Comparative Example 1 except that a polyimide film (trade name: APICAL 75AH film, thickness: 75 μm) manufactured by Kaneka Corporation and having a width of 250 mm and a length of 100 m was used as the polymer film 50. Results are shown in Table 6.

TABLE 6

| | Polymer film | | | Inner diameter of roll mm | Outer diameter of core mm | Gap between layers of film (Ts) | | | | |
|---|---|---|---|---|---|---|---|---|---|---|
| | Thickness (Tf) μm | Length m | Width mm | | | Gap formation method | Gap (Ts) μm | Ts/Tf | Gap formation ratio % | Location where gaps were formed |
| Example 18 | 75 | 100 | 250 | 100 | 100 | Insertion of slip sheet | 50 | 0.67 | 100 | Entire roll |
| Example 19 | 75 | 100 | 250 | 100 | 100 | Insertion of slip sheet | 75 | 1.00 | 100 | Entire roll |
| Comparative Example 5 | 75 | 100 | 250 | 100 | 100 | — | 0 | — | 0 | — |

| | Introduction | | | Evaluations | | | |
|---|---|---|---|---|---|---|---|
| | Pressure reduction at and below 450° C. | of nitrogen at and above pyrolysis onset temperature | Orientation of roll of polymer film in furnace | Carbonaceous film | | Graphite film | |
| | | | | Fusion bonding | | Fusion bonding | |
| | | | | Number of layers where fusion bonding occurred | Rippling | Number of layers where fusion bonding occurred | Rippling |
| Example 18 | Not performed | Performed | Vertical | 15 | D | A | 15 | D | A |
| Example 19 | Not performed | Performed | Vertical | 13 | C | B | 13 | C | B |
| Comparative Example 5 | Not performed | Performed | Vertical | 50 | E | B | 50 | E | B |

Example 19

Example 19 was performed in the same manner as in Example 3 except that a polyimide film (trade name: APICAL 75AH film, thickness: 75 μm) manufactured by Kaneka Corporation and having a width of 250 mm and a length of 100 m was used as the polymer film 50. Just after the formation of gaps, all the gaps formed between the layers of the polymer film had a uniform size of 50 μm±2.0 μm. Results are shown in Table 6.

It was found that even when the length of the polymer film was changed to 100 m, fusion bonding could be significantly improved by providing gaps between the layers of the polymer film.

Example 20

Example 20 was performed in the same manner as in Example 2 except that the roll of polymer film was horizontally set in the indirect heating furnace. Just after the formation of gaps, all the gaps formed between the layers of the polymer film had a uniform size of 50 μm±2.0 μm. Results are shown in Table 7.

TABLE 7

| | Polymer film | | | Inner diameter of roll mm | Outer diameter of core mm | Gap formation method | Gap between layers of film (Ts) | | | |
|---|---|---|---|---|---|---|---|---|---|---|
| | Thickness (Tf) μm | Length m | Width mm | | | | Gap (Ts) μm | Ts/Tf | Gap formation ratio % | Location where gaps were formed |
| Example 2 | 75 | 50 | 250 | 100 | 100 | Insertion of slip sheet | 50 | 0.67 | 100 | Entire roll |
| Example 20 | 75 | 50 | 250 | 100 | 100 | Insertion of slip sheet | 50 | 0.67 | 100 | Entire roll |

| | Pressure reduction at and below 450° C. | Introduction of nitrogen at and above pyrolysis onset temperature | Orientation of roll of polymer film in furnace | Evaluations | | | | | |
|---|---|---|---|---|---|---|---|---|---|
| | | | | Carbonaceous film | | | Graphite film | | |
| | | | | Fusion bonding | | | Fusion bonding | | |
| | | | | Number of layers where fusion bonding occurred | | Rippling | Number of layers where fusion bonding occurred | | Rippling |
| Example 2 | Not performed | Performed | Vertical | 0 | A | A | 0 | A | A |
| Example 20 | Not performed | Performed | Horizontal | 0 | A | A | 0 | A | A |

As in the case of vertically setting the roll of polymer film, both fusion bonding and rippling could be suppressed when the roll of polymer film was horizontally set.

Example 21

Example 21 was performed in the same manner as in Example 2 except that a polyimide film (thickness: 50 μm) having a width of 25 mm and a length of 50 m was used as the slip sheet 80. Just after the formation of gaps, all the gaps formed between the layers of the polymer film had a uniform size of 50 μm±2.0 μm. Results are shown in Table 8.

Example 22

Example 22 was performed in the same manner as in Example 2 except that a polyethylene (PE) film (thickness: 50 μm) having a width of 25 mm and a length of 50 m was used as the slip sheet 80. Just after the formation of gaps, all the gaps formed between the layers of the polymer film had a uniform size of 50 μm±2.0 μm. Results are shown in Table 8.

TABLE 8

| | Polymer film | | | Inner diameter of roll mm | Outer diameter of core mm | Gap formation method | Gap between layers of film (Ts) | | | |
|---|---|---|---|---|---|---|---|---|---|---|
| | Thickness (Tf) μm | Length m | Width mm | | | | Type of film | Gap (Ts) μm | Ts/Tf % | Gap formation ratio |
| Example 2 | 75 | 50 | 250 | 100 | 100 | Insertion of slip sheet | PET FILM | 50 | 0.67 | 100 |
| Example 21 | 75 | 50 | 250 | 100 | 100 | Insertion of slip sheet | Polyimide film | 50 | 0.67 | 100 |
| Example 22 | 75 | 50 | 250 | 100 | 100 | Insertion of slip sheet | PE FILM | 50 | 0.57 | 100 |

| | Location where gaps were formed | Introduction | | | Evaluations | | | | | |
|---|---|---|---|---|---|---|---|---|---|---|
| | | Pressure reduction at and below 450° C. | of nitrogen at and above pyrolysis onset temperature | Orientation of roll of polymer film in furnace | Carbonaceous film | | | Graphite film | | |
| | | | | | Fusion bonding | | | Fusion bonding | | |
| | | | | | Number of layers where fusion bonding occurred | | Rippling | Number of layers where fusion bonding occurred | | Rippling |
| Example 2 | Entire roll | Not performed | Performed | Vertical | 0 | A | A | 0 | A | A |
| Example 21 | Entire roll | Not performed | Performed | Vertical | 0 | A | A | 0 | A | A |
| Example 22 | Entire roll | Not performed | Performed | Vertical | 0 | A | A | 0 | A | A |

Even when a polyimide film or a polyethylene film was used as the slip sheet, gaps between the layers of the polymer film could be formed stably and therefore both fusion bonding and rippling could be suppressed.

Example 23

A polyimide film (trade name: APICAL 75AH film, thickness: 75 μm) manufactured by Kaneka Corporation and having a width of 250 mm and a length of 50 m was prepared as a polymer film 50, and as shown in FIG. 6, the polymer film 50 was rewound around the center of a core 100 having a diameter of 100 mm and a length of 300 mm. As shown in FIG. 6, the polymer film 50 was wound up under conditions of a tension of 80 N/m and a winding speed of 10 m/min while one of the surfaces of the film was diselectrified by a diselectrifier 40. It is to be noted that the tension was detected using a pick-up roller 300 shown in FIG. 6. After the completion of winding, the roll of polymer film was vertically set together with the core 100 as shown in FIG. 9, and a tube having an inner diameter of 134 mm was further set outside the roll of polymer film and the polymer film was rewound in a direction opposite to the winding direction of the polymer film to form gaps between the layers of the polymer film. Just after the formation of gaps, all the gaps formed between the layers of the polymer film were almost uniform in size and had an average size of 50 μm.

Then, the roll of polymer film having gaps was vertically set together with the core 100 in an indirect heating furnace as shown in FIG. 5. It is to be noted that at this time, the roll of polymer film was set so that the end thereof was flat without irregularities. The roll of polymer film was subjected to carbonization treatment by electrically heating a heater 500 provided outside the roll of polymer film to increase the temperature in the furnace from room temperature to 1000° C. at a temperature rise rate of 1° C./min while nitrogen gas was introduced at a flow rate of 5 L/min. At this time, the nitrogen gas was introduced through an inlet port 65, and therefore exhaust was directed toward a pipe 70. Results are shown in Table 9.

TABLE 9

| | Polymer film | | | Inner diameter of roll mm | Outer diameter of core mm | Gap between layers of film (Ts) | | | | |
|---|---|---|---|---|---|---|---|---|---|---|
| | Thickness (Tf) μm | Length m | Width mm | | | Gap formation method | (Ts) μm | Ts/Tf | Gap formation ratio % | Location where gaps were formed |
| Example 2 | 75 | 50 | 250 | 100 | 100 | Insertion of slip sheet | 50 | 0.67 | 100 | Entire roll |
| Example 23 | 75 | 50 | 250 | 100 | 100 | Rewinding | 50 | 0.67 | 100 | Entire roll |

| | Pressure reduction at and below 450° C. | Introduction of nitrogen at and above pyrolysis onset temperature | Orientation of roll of polymer film in furnace | Evaluations | | | | | |
|---|---|---|---|---|---|---|---|---|---|
| | | | | Carbonaceous film | | | Graphite film | | |
| | | | | Fusion bonding | | | Fusion bonding | | |
| | | | | Number of layers where fusion bonding occurred | | Rippling | Number of layers where fusion bonding occurred | | Rippling |
| Example 2 | Not performed | Performed | Vertical | 0 | A | A | 0 | A | A |
| Example 23 | Not performed | Performed | Vertical | 0 | A | B | 0 | A | B |

As in the case of Example 2 in which gaps were formed between the layers of polymer film using a slip sheet, carbonization could be performed without the occurrence of fusion bonding in Example 23 in which gaps were formed between the layers of the polymer film by rewinding. However, the gaps between the layers of the polymer film were slightly non-uniform in size, and therefore rippling slightly occurred.

Comparative Example 6

Comparative Example 6 was performed in the same manner as in Example 1 except that a PET film (thickness: 1251 m) having a width of 25 mm and a length of 50 m was used as the slip sheet 80. Just after the formation of gaps, all the gaps formed between the layers of the polymer film had a uniform size of 50 μm±2.0 μm. Results are shown in Table 10.

without using a slip sheet. Just after the formation of gaps, all the gaps formed between the layers of the polymer film in the inner peripheral-side one-fifth of the roll of polymer film had a uniform size of 50 μm±2.0 μm. Results are shown in Table 11. The value of Ts/Tf of part of the roll of polymer film where gaps were formed (part from the end of the innermost layer to the 20% film length point of the roll of polymer film) was 0.67 and the value of Ts/Tf of the entire roll of polymer film was 0.13.

Example 25

Example 25 was performed in the same manner as in Example 2 except that the first 25 m of the polymer film was wound up without using a slip sheet and the last 25 m of the polymer film was wound up together with a PET film (thick-

TABLE 10

| | Polymer film | | | Inner diameter of roll mm | Outer diameter of core mm | Gap formation method | Gap between layers of film (Ts) | | | |
|---|---|---|---|---|---|---|---|---|---|---|
| | Thickness (Tf) μm | Length m | Width mm | | | | Gap (Ts) μm | Ts/Tf | Gap formation ratio % | Location where gaps were formed |
| Comparative Example 6 | 75 | 50 | 250 | 100 | 100 | Insertion of slip sheet | 125 | 1.67 | 100 | Entire roll |

| | Introduction | | | Evaluations | | | | | |
|---|---|---|---|---|---|---|---|---|---|
| | Pressure reduction at and below 450° C. | of nitrogen at and above pyrolysis onset temperature | Orientation of roll of polymer film in furnace | Carbonaceous film | | | Graphite film | | |
| | | | | Fusion bonding | | | Fusion bonding | | |
| | | | | Number of layers where fusion bonding occurred | | Rippling | Number of layers where fusion bonding occurred | | Rippling |
| Comparative Example 6 | Not performed | Performed | Vertical | 0 | A | D | 0 | A | D |

In Comparative Example 6 in which the value of Ts/Tf was as high as 1.67, fusion bonding did not occur but the degree of rippling was great.

Example 24

Example 24 was performed in the same manner as in Example 2 except that the first 12.5 m of the polymer film was wound up together with the two slip sheets so that the slip sheets were inserted between the layers of the polymer film and the last 37.5 m of the polymer film was wound up without using a slip sheet. Just after the formation of gaps, all the gaps formed between the layers of the polymer film in the inner peripheral-side quarter of the roll of polymer film had a uniform size of 50 μm±2.0 μm. Results are shown in Table 11. The value of Ts/Tf of part of the roll of polymer film where gaps were formed (part from the end of the innermost layer to the 25% film length point of the roll of polymer film) was 0.67 and the value of Ts/Tf of the entire roll of polymer film was 0.16.

Comparative Example 7

Comparative Example 7 was performed in the same manner as in Example 2 except that the first 10 m of the polymer film was wound up together with the two slip sheets so that the slip sheets were inserted between the layers of the polymer film and the last 40 m of the polymer film was wound up ness: 30 μm) used as the slip sheet 80 and having a width of 25 mm and a length of 25 m so that the two slip sheets were inserted between the layers of the polymer film. Just after the formation of gaps, all the gaps formed between the layers of the polymer film in the outer peripheral-side half of the roll of polymer film had a uniform size of 30 μm±2.0 μm. Results are shown in Table 11. The value of Ts/Tf of part of the roll of polymer film where gaps were formed (part from the 50% film length point to the end of the outermost layer of the roll of polymer film) was 0.40 and the value of Ts/Tf of the entire roll of polymer film was 0.20.

Comparative Example 8

Comparative Example 8 was performed in the same manner as in Example 2 except that the first 40 m of the polymer film was wound up without using a slip sheet and the last 10 m of the polymer film was wound up together with the two slip sheets so that the slip sheets were inserted between the layers of the polymer film. Just after the formation of gaps, all the gaps formed between the layers of the polymer film in the outer peripheral-side one-fifth of the roll of polymer film had a uniform size of 50 μm±2.0 μm. Results are shown in Table 11. The value of Ts/Tf of part of the roll of polymer film where gaps were formed (the outer peripheral-side one-fifth of the roll of polymer film) was 0.67 and the value of Ts/Tf of the entire roll of polymer film was 0.13.

TABLE 11

| | Polymer film | | | Inner diameter of roll mm | Outer diameter of core mm | Gap formation method | Gap between layers of film (Ts) | | | | Ts/Tf of entire roll |
|---|---|---|---|---|---|---|---|---|---|---|---|
| | Thickness (Tf) μm | Length m | Width mm | | | | Gap (Ts) μm | Ts/Tf of only part where gaps were formed | Gap formation ratio % | Location where gaps were formed | |
| Example 2 | 75 | 50 | 250 | 100 | 100 | Insertion of slip sheet | 50 | 0.67 | 100 | Entire roll | 0.67 |
| Example 8 | 75 | 50 | 250 | 100 | 100 | Insertion of slip sheet | 50 | 0.67 | 75 | From end of innermost layer | 0.50 |
| Example 9 | 75 | 50 | 250 | 100 | 100 | Insertion of slip sheet | 50 | 0.67 | 50 | From end of innermost layer | 0.33 |
| Example 10 | 75 | 50 | 250 | 100 | 100 | Insertion of slip sheet | 50 | 0.67 | 30 | From end of innermost layer | 0.20 |
| Example 24 | 75 | 50 | 250 | 100 | 100 | Insertion of slip sheet | 50 | 0.67 | 25 | From end of innermost layer | 0.16 |
| Comparative Example 7 | 75 | 50 | 250 | 100 | 100 | Insertion of slip sheet | 50 | 0.67 | 20 | From end of innermost layer | 0.13 |
| Example 11 | 75 | 50 | 250 | 100 | 100 | Insertion of slip sheet | 50 | 0.67 | 50 | From end of outermost layer | 0.33 |
| Example 25 | 75. | 50 | 250 | 100 | 100 | Insertion of slip sheet | 30 | 0.40 | 50 | From end of outermost layer | 0.20 |
| Comparative Example 8 | 75 | 50 | 250 | 100 | 100 | Insertion of slip sheet | 50 | 0.67 | 20 | From end of outermost layer | 0.13 |
| Comparative Example 1 | 75 | 50 | 250 | 100 | 100 | — | 0 | — | 0 | — | — |

| | Introduction | | | Evaluations | | | | | |
|---|---|---|---|---|---|---|---|---|---|
| | Pressure reduction at and below 450° C. | of nitrogen at and above pyrolysis onset temperature | Orientation of roll of polymer film in furnace | Carbonaceous film | | | Graphite film | | |
| | | | | Fusion bonding | | | Fusion bonding | | |
| | | | | Number of layers where fusion bonding occurred | | Rippling | Number of layers where fusion bonding occurred | | Rippling |
| Example 2 | Not performed | Performed | Vertical | 0 | A | A | 0 | A | A |
| Example 8 | Not performed | Performed | Vertical | 0 | A | A | 0 | A | A |
| Example 9 | Not performed | Performed | Vertical | 0 | A | A | 0 | A | A |
| Example 10 | Not performed | Performed | Vertical | 8 | B | A | 8 | B | A |
| Example 24 | Not performed | Performed | Vertical | 12 | D | A | 12 | D | A |
| Comparative Example 7 | Not performed | Performed | Vertical | 20 | E | A | 20 | E | A |
| Example 11 | Not performed | Performed | Vertical | 10 | C | A | 10 | C | A |
| Example 25 | Not performed | Performed | Vertical | 15 | D | A | 15 | D | A |
| Comparative Example 8 | Not performed | Performed | Vertical | 20 | E | A | 20 | E | A |
| Comparative Example 1 | Not performed | Performed | Vertical | 20 | E | B | 20 | E | B |

As can be seen from the results of Examples 2, 8, 9, 10, and 24 and Comparative Example 7, the number of layers where fusion bonding occurred is higher when the ratio of gap formation is lower, and as can be seen from Example 24, fusion bonding can be suppressed when the value of Ts/Tf of the entire roll of polymer film is 0.16 or higher. On the other hand, as can be seen from the results of Examples 11 and 25, a fusion bonding-suppressing effect can be obtained even when gaps are localized on the outer peripheral side of the roll of polymer film. Further, as can be seen from the comparison between Examples 11 and 25, even when the ratio of gap formation is the same, a fusion bonding-suppressing effect is enhanced by increasing the value of Ts/Tf of the entire roll of polymer film from 0.20 to 0.33 by increasing the value of Ts/Tf of part of the roll of polymer film where gaps are formed from 0.40 to 0.67.

DESCRIPTION OF REFERENCE NUMERALS

5 Gap between adjacent layers of polymer film
10, 11, 12 Polymer film
40 Diselectrifier
50 Polyimide film
51 Polymer film wound around core
52 Roll of polymer film
55 Inner case
60 Stage
65 Inlet port
70 Discharge port
80 slip sheet
100 Core
110 Core used during heat treatment
200, 210 End of roll of carbonaceous film
300 Pick-up roller
310 Guide roller
500 Heater
600 Thickness of roll of polymer film after winding polymer film around core
610 Thickness of layers of polymer film wound around core
650 Stage

The invention claimed is:

1. A method for producing a carbonaceous film, the method comprising the steps of:
    winding a polymer film into a roll at a temperature lower than a pyrolysis onset temperature of the polymer film to have a gap between adjacent layers of the polymer film whereby the roll of polymer film as a whole satisfies a relationship in that a value obtained by dividing a thickness of the gap between adjacent layers of the polymer film (Ts) by a thickness of the polymer film (Tf) (Ts/Tf), is 0.16 or higher but 1.50 or lower; and then
    heat-treating the roll of polymer film so as to carbonize the polymer film and obtain a carbonaceous film.

2. The method for producing a carbonaceous film according to claim 1, wherein the gap between adjacent layers of the polymer film is formed by winding the polymer film into a roll together with a slip sheet and then removing the slip sheet before the step of heat-treating.

3. The method for producing a carbonaceous film according to claim 1, wherein the gap between adjacent layers of the polymer film is formed by rewinding the polymer film wound around a core in a direction opposite to a winding direction of the polymer film.

4. The method for producing a carbonaceous film according to claim 1, wherein the gap between adjacent layers of the polymer film is formed by reducing a pressure in a heating furnace at a temperature lower than the pyrolysis onset temperature of the polymer film.

5. A method for producing a graphite film, comprising heat-treating a carbonaceous film obtained by the carbonaceous film production method according to any one of claims 1 to 4 to a temperature of 2400° C. or higher.

6. The method for producing a carbonaceous film according to claim 1, wherein the (Ts/Tf) value is 0.50 or higher but 1.50 or lower.

7. The method for producing a carbonaceous film according to claim 1, wherein the (Ts/Tf) value is 0.67 or higher but 1.50 or lower.

* * * * *